(12) United States Patent
Pottish et al.

(10) Patent No.: US 7,445,131 B2
(45) Date of Patent: *Nov. 4, 2008

(54) APPARATUS AND METHOD FOR REUSABLE, NO-WASTE COLLAPSIBLE TUBE DISPENSERS

(75) Inventors: Susan Pottish, 216 W. Perkins, #303, Ukiah, CA (US) 95482; Howard Mullin, Newark, CA (US); Scott Anderson, 216 W. perkins, #303, Ukiah, CA (US) 95482; Morris Pottish, New York, NY (US)

(73) Assignees: Susan Pottish, Ukiah, CA (US); Scott Anderson, Ukiah, CA (US)

( * ) Notice: Subject to any disclaimer, the term of this patent is extended or adjusted under 35 U.S.C. 154(b) by 53 days.

This patent is subject to a terminal disclaimer.

(21) Appl. No.: 10/928,957

(22) Filed: Aug. 26, 2004

(65) Prior Publication Data
US 2006/0043106 A1    Mar. 2, 2006

(51) Int. Cl.
*B65D 35/44* (2006.01)
(52) U.S. Cl. .............................. 222/1; 222/92; 222/568
(58) Field of Classification Search .................... 222/92, 222/107, 568, 1
See application file for complete search history.

(56) References Cited

U.S. PATENT DOCUMENTS

| 2,252 | A | 9/1841 | Rand |
| 675,372 | A | 6/1901 | Brooks |
| 1,233,802 | A | 7/1917 | Lowe et al. |
| 1,293,860 | A | 1/1919 | Mock |
| 1,504,920 | A | 8/1924 | Viegelmann |
| 1,575,567 | A | 3/1926 | Geake |
| 1,592,567 | A | 7/1926 | Viegelmann |
| 1,690,654 | A | 7/1928 | Trotter |
| 2,101,855 | A | 12/1937 | Henderson |
| 2,128,035 | A | 8/1938 | Boetel |
| 2,182,243 | A | 12/1939 | Baker |
| 2,200,923 | A | 5/1940 | Hoggatt |
| 2,605,018 | A | 7/1952 | Croce et al. |
| 2,633,269 | A | 3/1953 | Hirschhorn |
| 2,893,710 | A | 7/1959 | Goodman |
| 3,510,893 | A | 5/1970 | Moore |
| 3,746,215 | A | 7/1973 | Ausnit et al. |

(Continued)

OTHER PUBLICATIONS

Earle Jennings performed web search results from Apr. 12, 2003, 42 pages.

(Continued)

*Primary Examiner*—Joseph A. Kaufman

(57) ABSTRACT

The invention includes a method of using a cap containing an internal thread form matching an external thread form on a flexible throat for a collapsible tube enclosing at least one contained product. Twisting the cap engages the internal thread form and the external thread form. These collectively urge the cap and the flexible throat to seal the contained product into the collapsible tube. Deforming the flexible throat through squeezing the collapsible tube dispenses essentially all the product. The collapsible tube may preferably include an external thread form on a flexible throat coupled to a flexible shoulder. The external thread form mates to a cap with an internal thread form urging the flexible throat to seal against the cap when the cap is twisted onto the flexible throat. The flexible throat and flexible shoulder flatten to dispense essentially all of the product.

113 Claims, 15 Drawing Sheets

U.S. PATENT DOCUMENTS

| | | | |
|---|---|---|---|
| 3,794,200 | A | 2/1974 | Marks |
| 3,832,964 | A | 9/1974 | Rockefeller |
| 3,917,116 | A | 11/1975 | Mason |
| 4,443,564 | A * | 4/1984 | Hauschild et al. ........... 523/105 |
| 4,492,548 | A | 1/1985 | Hubert |
| 4,526,297 | A | 7/1985 | Grimsley |
| 5,105,985 | A * | 4/1992 | Kroeber ..................... 222/107 |
| 5,690,764 | A | 11/1997 | Dirksing et al. |
| 6,279,780 | B1 * | 8/2001 | Rousselet .................. 222/107 |
| 6,776,307 | B1 | 8/2004 | Hagihara |
| 2001/0027957 | A1 | 10/2001 | Kano |
| 2002/0148854 | A1 | 10/2002 | Egerhazy |
| 2002/0179635 | A1 | 12/2002 | Incardona |
| 2003/0029884 | A1 | 2/2003 | Rau |
| 2006/0043105 | A1 * | 3/2006 | Pottish et al. ................. 222/92 |

OTHER PUBLICATIONS

Web site capture, "Flexa-Tube Graham Packaging", Aug. 11, 2004, 1 page.
Web site capture, "Fasteners for Plastics", Aug. 11, 2004, 2 pages.
Web site capture, "News room", www.grahampackaging.com, Aug. 11, 2004, 2 pages.
Web site capture, "Product overview: Hagy System", www.packexpo.com, Jul. 7, 2005, 6 pages.
Web site capture, "Spiralock Corp. introduces new fastener thread form", www.spiralock.com, Aug. 11, 2004, 3 pages.

* cited by examiner

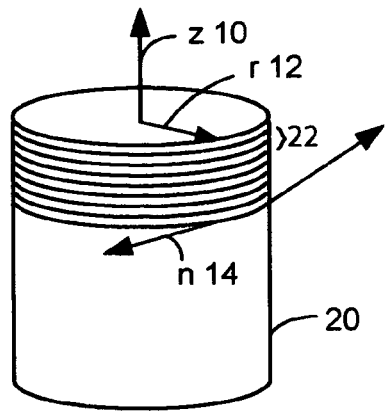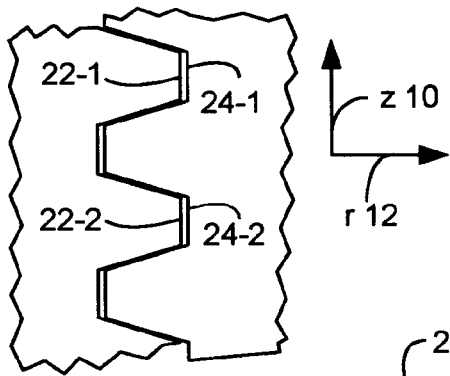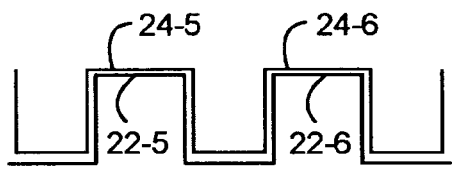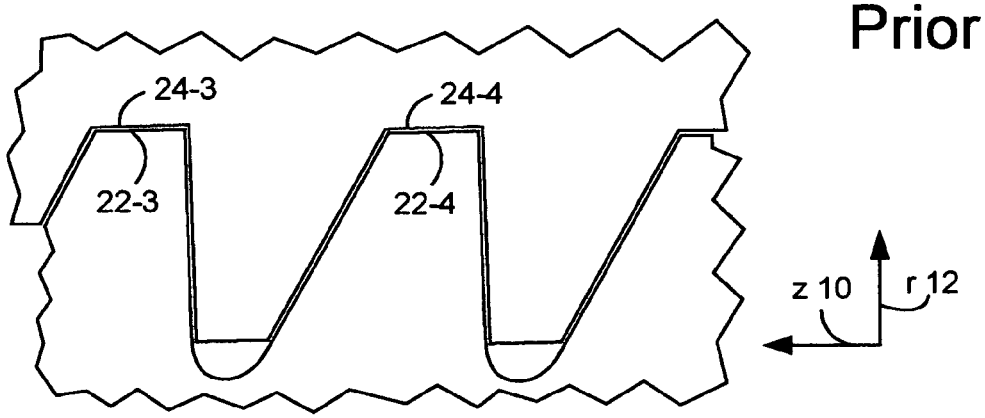
Fig. 1A Prior Art
Fig. 1B Prior Art
Fig. 1D Prior Art
Fig. 1C Prior Art
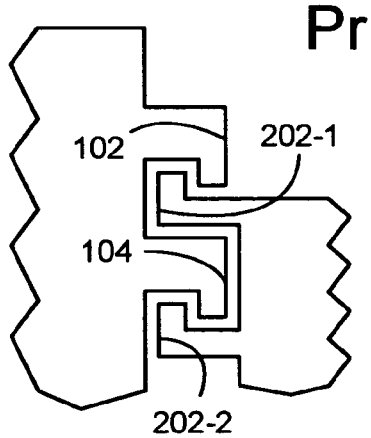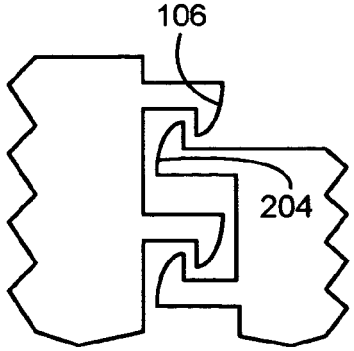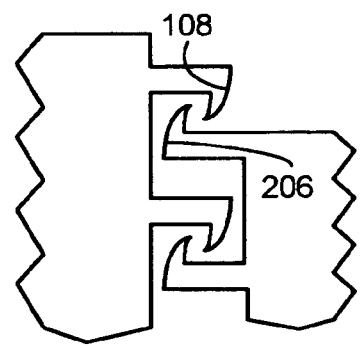
Fig. 2A
Fig. 2B
Fig. 2C

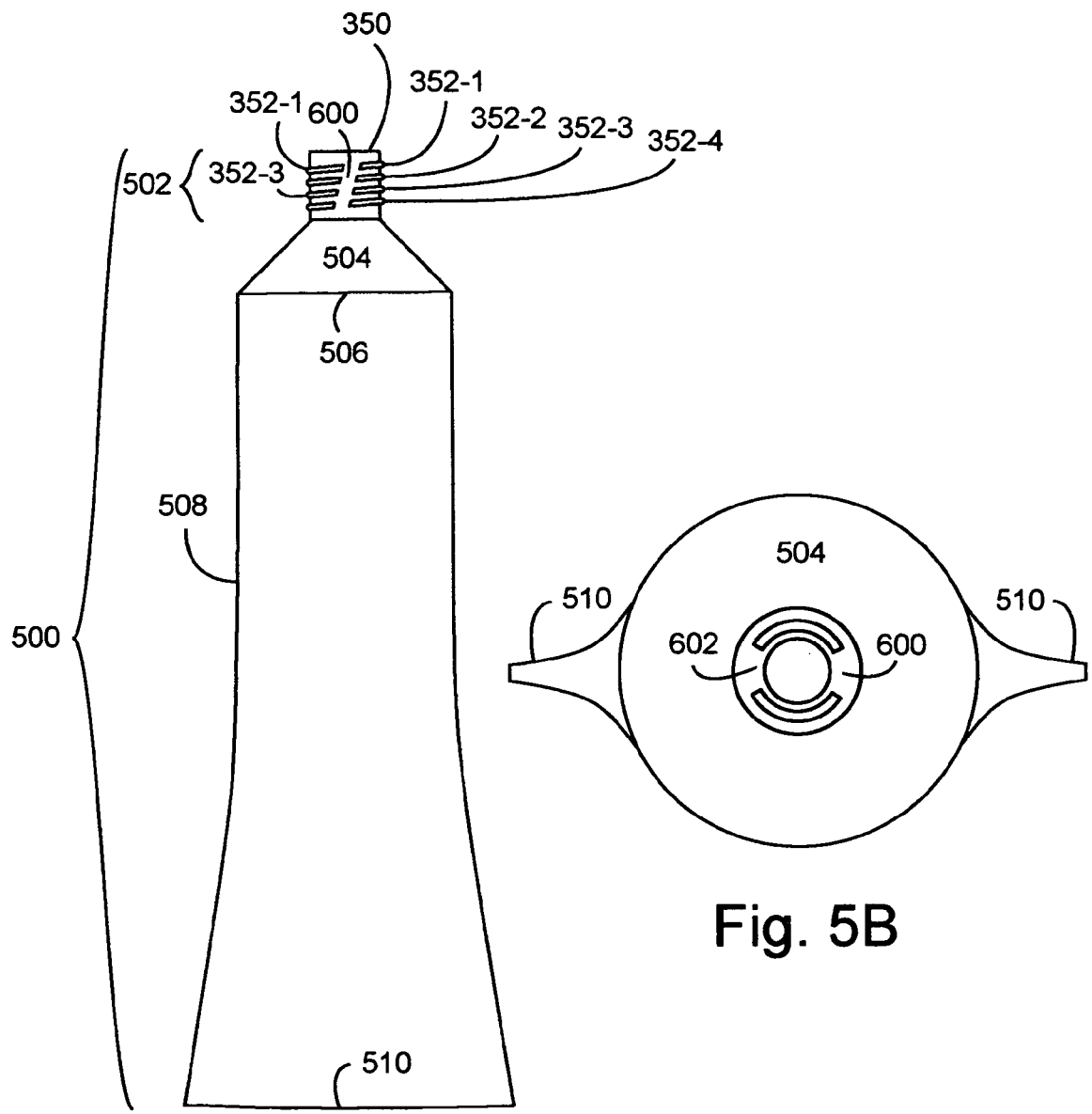

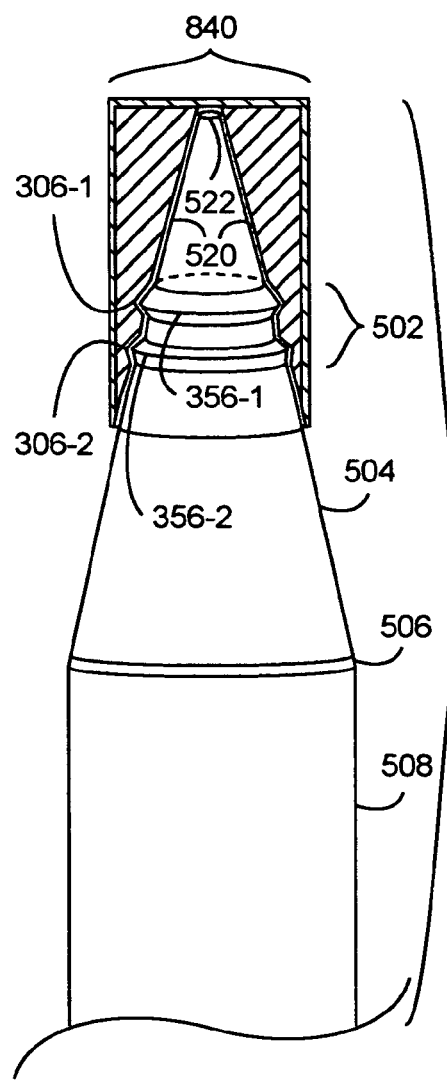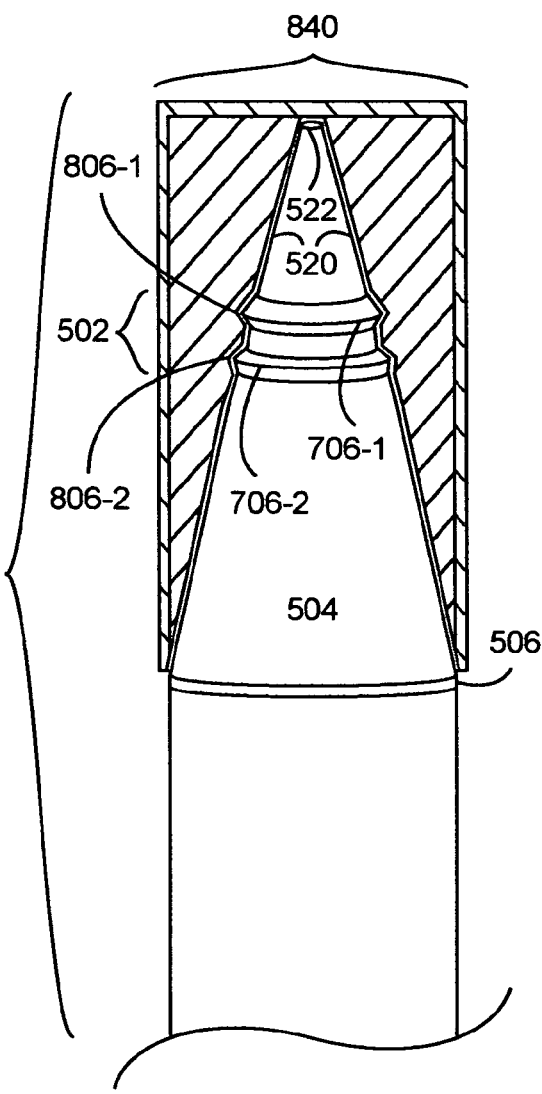
Fig. 10A
Fig. 10B

APPARATUS AND METHOD FOR REUSABLE, NO-WASTE COLLAPSIBLE TUBE DISPENSERS

BACKGROUND OF THE INVENTION

1. Field of the Invention

The invention relates to screw and cap mechanisms with particular application to forming collapsible tube dispensers.

2. Background Information

The earliest collapsible tube dispensers in the US patent database date from the early nineteenth century. Since that time, there has been continued innovation, leading to the various collapsible tube dispensers used for pharmaceuticals, personal care products, toothpaste, foods, artist's paints, glues, hazardous chemicals, grease products and viscous plastics, to name some of the more common uses of these tubes. As used herein, personal care products include, but are not limited to, cosmetics, facial care products, skin care products, and/or hair care products.

There are problems with the collapsible tube technologies of the prior art. They do not lend themselves both to being reusable and supporting the complete, controlled dispensing of their contents. As the term is used herein, reusable will refer to the capability to dispense small, or controlled, portions of the contents multiple times, perhaps on different occasions. Reusable may further refer to the capability to refill the contents multiple times. And reusable may further refer to a container, which can be cleaned, and refilled with differing contents.

One prior art collapsible tube dispenses all the tube's contents and is reuseable. The tube is not cylindrical but a two-sided pouch of soft plastic material. The tube has a mechanism of closing the throat, requiring no conventional screw and cap. The throat contains a soft plastic sheet insert that effectively sucks itself closed when pressure is released. This tube may be limited to applications in which there is no unexpected or forceful pressure applied to the tube. Example applications where it is not applicable include being packed in a suitcase, or purse, since the closure responds to finger pressure. The tube may also be limited to applications in which a high degree of barrier to the environment is not critical, such as pharmaceuticals, because the opening does not clean itself when closing except to the degree that it draws contents outside the tube to the inside of the tube. It may be undesirable for personal care products or other products demanding a high degree of aesthetic features, such as oversized caps allowing the tube to stand vertically.

There are some one-time use containers made essentially of a squeeze tube with a narrow end, which is cut to open the tube. All of the contents are then squeezed out, and the tube is discarded. These one-time use containers are not reusable, and represent a significant amount of overhead both for the manufacturer and for the ecology of people and systems, which must cope with these discarded containers.

With the exception of some one-time use containers, collapsible tube dispensers typically possess a rigid shoulder and a rigid throat. The rigid throat provides an exterior, rigid screw. This exterior rigid screw mates with a cap providing a matching interior screw pattern. When the cap is screwed onto the exterior screw of the throat, a seal is formed, which seals in the contents of the collapsible tube.

For the last century or two, screws have been built with either threads that taper away from the body, or remain of constant thickness. These screw threads will be referred to herein as open threads. Up until now, using these open thread screws requires that the throat of a collapsible tube be essentially rigid. An essentially rigid throat on a collapsible tube dispenser virtually guarantees that some of the tube contents will not readily leave the tube, causing the tube to waste some of its contents. The rigid shoulder further guarantees this waste.

The use of tubes for carrying food in sports and wilderness exploration environments is well-known. None on the market, however, are both reusable and completely collapsible. Thus, they do not dispense all their contents. A refillable tube that does dispense all its contents is especially desirable when food is otherwise scarce.

FIG. 1A shows a prior art exterior screw 20 with a prior art external thread form 22. The prior art external thread form 22 is shown in an expanded view through the following examples shown in FIGS. 1B and C with a matching internal thread form 24.

There is a local coordinate system in FIG. 1A, which will be used throughout this document. The z axis 10 extends through the center of the cylinder of the prior art exterior screw 20, and is the central axis of the cylinder. The r axis 12 is the radial direction of the thread at a point, which, for the sake of discussion, is referred to as thread point 22 in FIG. 1A. The n axis 14 is normal to the thread point 22. When the screw is turned in the n direction, it engages more of the threads.

The engagement of an exterior screw thread and matching interior screw is shown in the expanded view of the prior art open screw thread 22 in FIG. 1A. The expanded view is a cross-section of the threads taken in the plane of the z axis 10 and the r axis 12.

FIG. 1B shows an example of FIG. 1A using a standard acme thread for the external thread form 22 and the matching internal thread form 24. A first external acme thread 22-1 matches the first internal acme thread 24-1. A second external acme thread 22-2 with the second internal acme thread 24-2.

FIG. 1C shows an example of FIG. 1A using a standard buttress thread for the external thread form 22 and the matching internal thread form 24. A first external buttress thread 22-3 matches the first internal buttress thread 24-3. A second external buttress thread 22-4 with the second internal buttress thread 24-4.

FIG. 1D shows an example of FIG. 1A using a box thread for the external thread form 22 and the matching internal thread form 24. A first external box thread 22-5 matches the first internal box thread 24-5. A second external box thread 22-6 with the second internal box thread 24-6.

One skilled in the art will recognize that FIGS. 1B to 1D show some of the many variations in open threads in use today. Other commonly used threads include various "V" shaped threads, as well as variations in angles of the walls, variations in the shape of the peaks and troughs of the threads.

To summarize, what is needed is a reusable collapsible tube, which can dispense essentially all of its contents. There is a need for reusable collapsible tubes which may be reopened to load the contents, particularly for food containers for use in travel and wilderness settings.

SUMMARY OF THE INVENTION

The invention includes a method of using a cap containing an internal thread form matching an external thread form on a flexible throat for a collapsible tube enclosing at least one contained product. Twisting the cap engages the internal thread form and the external thread form. These collectively urge the cap and the flexible throat to seal the contained product into the collapsible tube. Deforming the flexible throat through squeezing the collapsible tube dispenses essentially all of the contained product.

This method of using a collapsible tube permits dispensing essentially all of the contained product. The collapsible tube is also reusable, permitting its use in a variety of fields where today everyone is forced to waste the last part of the contained product. This is valuable in such diverse areas of application as pharmaceuticals, personal care products, toothpaste, foods, artist's paints, glues, hazardous chemicals, grease products, and viscous plastics.

The collapsible tube may preferably include an external thread form on a flexible throat coupled to a flexible shoulder mating to a collapsible tube body. The external thread form mates to a cap with an internal thread form urging the flexible throat to seal against the cap when the cap is twisted onto the flexible throat. The flexible throat and the flexible shoulder flatten with the collapsible tube body to dispense essentially all of the product.

The external thread form may preferably include at least two external threads. Each of the external threads may be external ridged threads. A ridged thread will refer to a thread that has its terminating end(s) bulge and/or bend. Various examples of ridged threads are shown in FIGS. 2A to 3B.

The external thread form may be preferred to have at least one break in the external threads. The break may form a column, a canted column, or a fluted column. The fluted column may widen toward the flexible shoulder, or away from the flexible shoulder.

BRIEF DESCRIPTION OF THE DRAWINGS

FIG. 1A shows a prior art exterior screw with a prior art external thread form;

FIG. 1B shows a prior art example of FIG. 1A using a standard acme thread for the external thread form and the matching internal thread form;

FIG. 1C shows a prior art example of FIG. 1A using a standard buttress thread for the external thread form and the matching internal thread form;

FIG. 1D shows an example of FIG. 1A using a box thread for the external thread form and the matching internal thread form;

FIGS. 2A to 2I show various matching ridged screw thread forms in the normal cross-section perspective;

FIG. 5A shows a top view of a collapsible tube as in FIG. 4B showing a first break forming a canted column;

FIG. 5B shows a front view of the collapsible tube in FIG. 5A showing a first break and a second break;

FIGS. 10A and 10B show two implementations of a collapsible tube including a flexible cone narrowing from the flexible throat away from the flexible shoulder and including a narrow opening for dispensing essentially all of a contained product.

DETAILED DESCRIPTION

FIGS. 2A to 2I show various matching ridged screw thread forms in the normal cross-section. In certain embodiments, the ridged thread form on the left side, known hereafter as the left ridged thread form, may be preferred as the internal thread form. The ridged thread form on the right side, known hereafter as the right ridged thread form, would be the external thread form. Alternatively, the right ridged thread form may be preferred as the internal thread form and the left ridged thread form would be the external thread form. A ridged thread will refer to a thread that has its terminating end(s) bulge and/or bend.

In FIGS. 2D to 2I, the ridged thread form on either the left side or right side may not be immediately repeated. The thread pattern of the left ridged thread form is not immediately repeated in the thread pattern of the right ridged thread form. In FIGS. 2E, 2G, 2H and 2I, the right ridged thread form varies in each successive ridged thread.

In FIG. 2A, the left ridged thread form includes a first left screw thread 102 and a second left screw thread 104. The right ridged thread form includes a first instance of first right screw thread 202-1 and a second instance of first right screw thread 202-2. The first left screw thread 102 matches the first instance of first right screw thread 202-1. The first left screw thread 102 may differ from the first instance of first right screw thread 202-1. A second left screw thread 104 matches a second instance of first right screw thread 202-2.

Figure 2D:
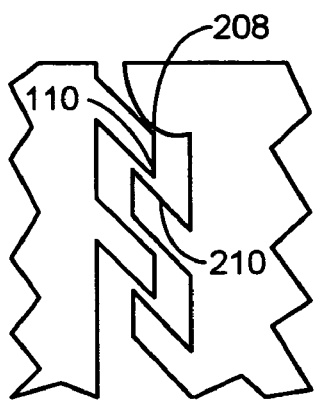
Figure 2E:
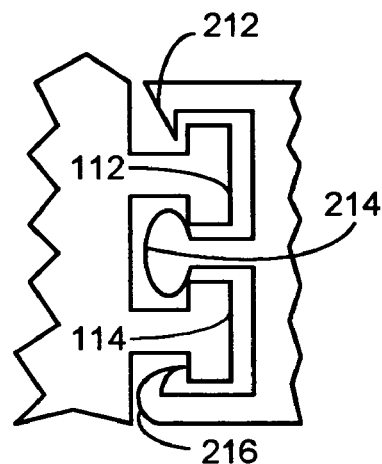
Figure 2F:
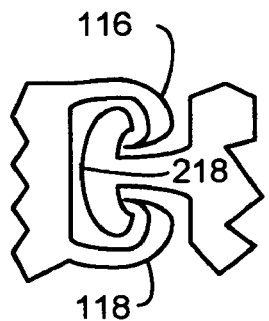
Figure 2G:
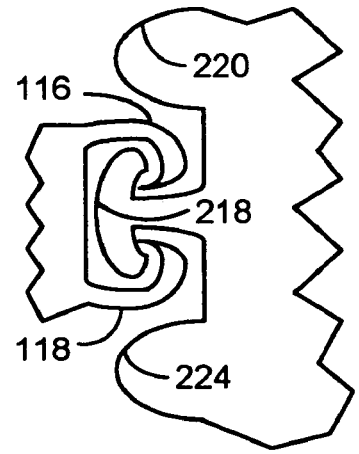
Figure 2H:
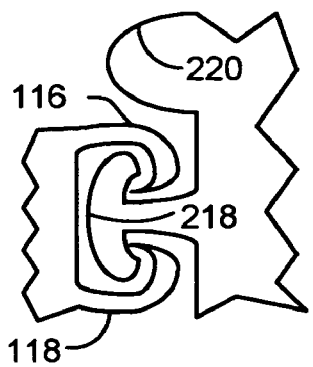
Figure 2I:
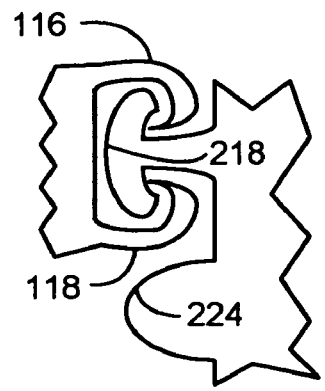

In FIG. 2E, the right ridged thread form varies successively in each of the sixth right thread 212, the seventh right thread 214, and the eighth right thread 216.

The ridged thread pattern on one or both of the right ridged thread form and the left ridged thread form may be immediately repeated. In FIGS. 2B, 2C, and 2D both the left side ridged thread and matching right side ridged thread immediately repeat. In FIG. 2E, the sixth left thread 112 is seen to immediately repeat in the seventh left thread 114, whereas the matching ridged threads on the right side vary. These matching right ridged threads are the sixth right thread 212, the seventh right thread 214, and the eighth right thread 216. The number of ridged threads on one side may differ from the number of ridged threads on the other side. In FIG. 2E, two left side ridged threads match to engage three ridged threads on the right side. In FIGS. 2F to 2I, two left side ridged threads match to engage one ridged thread on the right side.

In FIGS. 2D, 2G, 2H, and 2I, ridge bumps are provided. Often the ridge bump, shown in these Figures on the right, acts to urge a ridged thread on the left side to engage a matching, and neighboring, ridged thread on the right side. One skilled in the art will recognize that while the ridge bumps are only shown on the right side in these drawings, this is done to simplify the figures and discussion, and is not meant to limit the scope of the invention. Ridge bump 208 urges left side thread 110 to engage with matching ridged thread 210 in FIG. 2D. Ridge bump 220 urges left side thread 116 to engage with matching ridged thread 218 in FIGS. 2G and 2H. Ridge bump 224 urges left side thread 118 to engage with matching ridged thread 218 in FIGS. 2G and 2I.

The materials of which the left side and right side of FIGS. 2A to 2I are made may vary from rigid, to essentially rigid, to somewhat flexible, to flexible. By way of example, the ridged threads of FIG. 2A may preferably be at least essentially rigid. The ridged threads of FIG. 2B may preferably be more flexible than FIG. 2A. The ridged threads of FIG. 2C may preferably be somewhat flexible to flexible. The left and right side may preferably be made of different materials, one more rigid and the other more flexible.

Figure 3A:
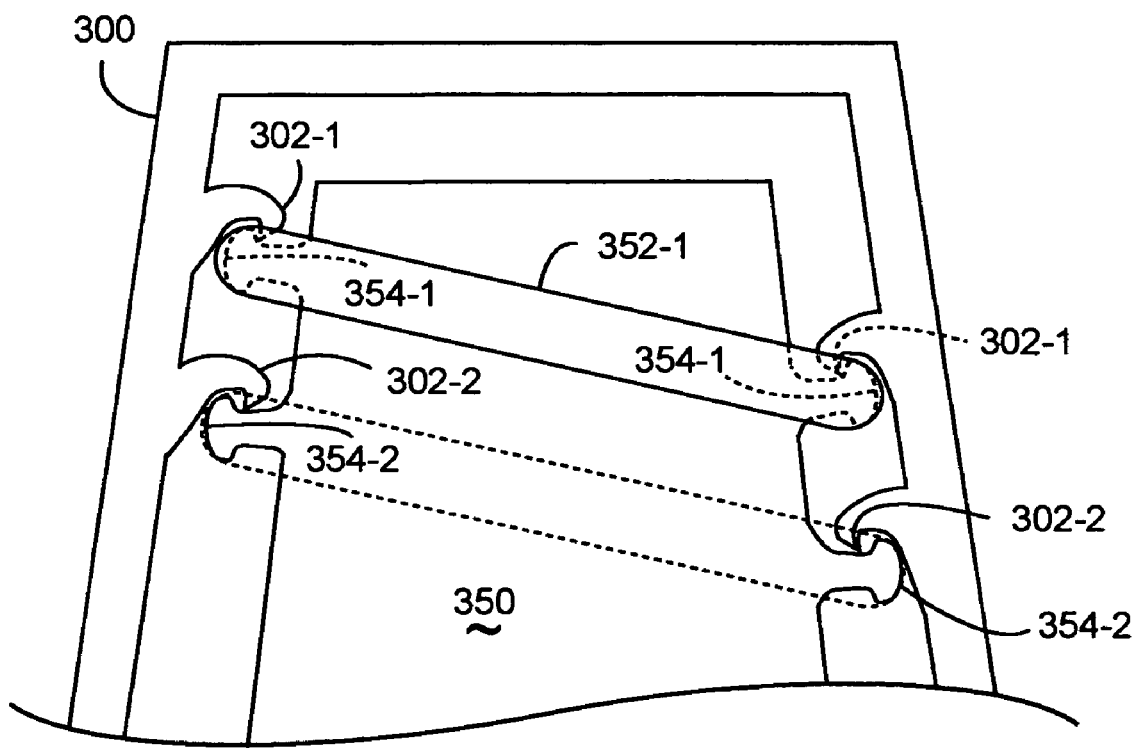
FIGS. 3A and 3B show aspects of the invention to further include collapsible tubes with a flexible throat made with at least one ridged thread exterior screw, and locked by a cap possessing at least one essentially rigid interior ridged thread screw.
Figure 3B:
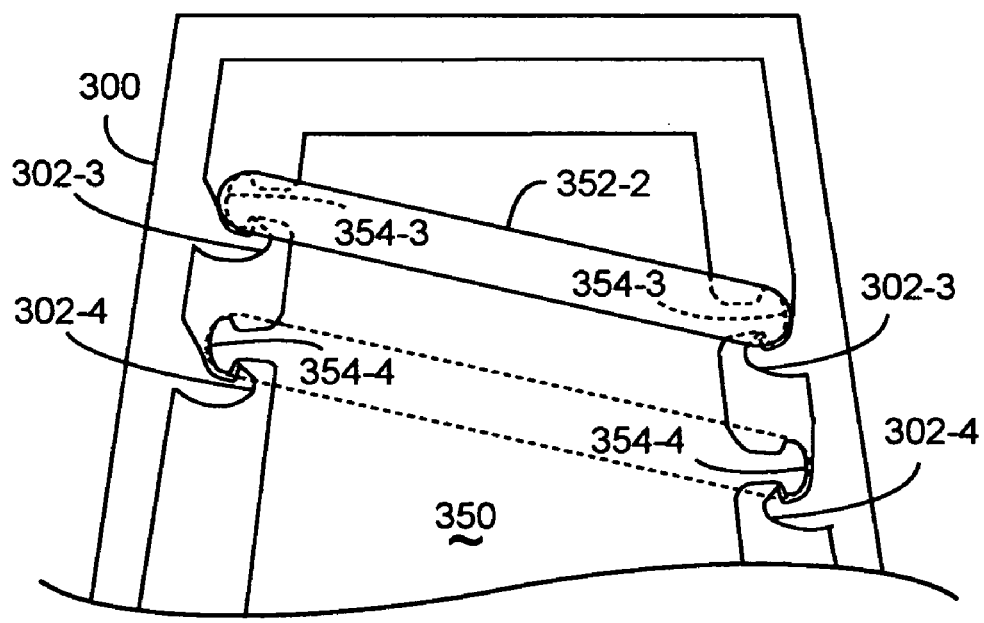

FIGS. 3A and 3B show aspects of the invention to further include collapsible tubes with a flexible throat 350 made with at least one ridged thread exterior screw 352, and locked by a cap 300 possessing at least one essentially rigid interior ridged thread screw 302. In certain aspects of the invention, the flexibility of the collapsible tube and the throat may be essentially the same. In certain other aspects, the flexibility of the collapsible tube and the throat may differ. These collapsible tubes are reusable and support the complete, controlled dispensing of their contents. One skilled in the art will recognize that the ridged threads in these Figures are on a flexible throat with conical shape.

FIG. 3A shows a flexible throat 350 with at least two ridged threads 352 and 354. In FIG. 3A, cap 300 has two interior ridged threads 302-1 and 302-2, whose ridges face downward. In FIG. 3B, the preferred cap 300 has two interior ridged threads 302-3 and 302-4, which face upward. In general it is believed that caps with at least one interior ridged thread facing upward are preferred.

The invention's collapsible tubes preferably utilize a flexible shoulder 504, shown in FIGS. 4A to 9H, being squeezed toward the flexible throat 502, which concentrates the contents 900 so that very little is wasted in normal use.

Figure 4A:
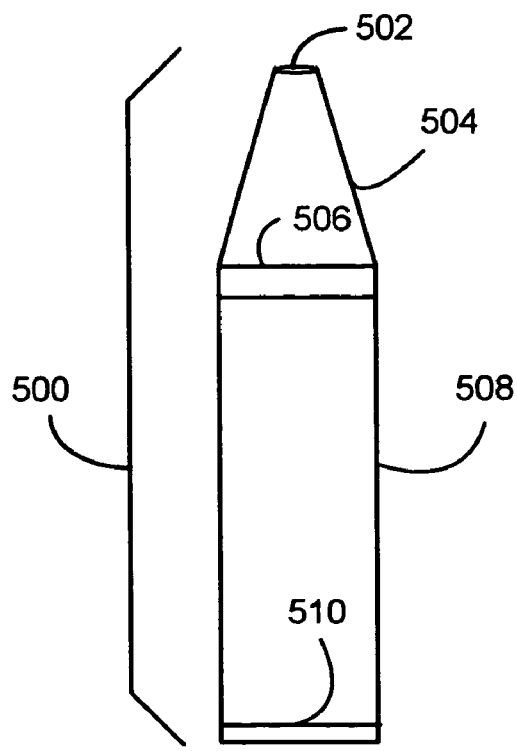
FIG. 4A, the invention's collapsible tubes employ a shape including the flexible throat coupled to the flexible shoulder which mates to a collapsible tube body.

In FIG. 4A, the invention's collapsible tubes employ a shape 500 including the flexible throat 502 coupled to the flexible shoulder 504 which mates 506 to a collapsible tube body 508. The collapsible tube body 508 terminates in a tube closure 510, which may be permanent or reopenable.

Figure 4B:
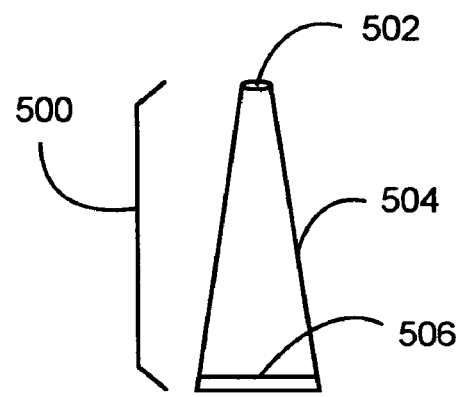
FIG. 4B, the invention's collapsible tubes employ a shape including the flexible throat coupled to the flexible shoulder, which mates to itself.

In FIG. 4B, the invention's collapsible tubes employ a shape 500 including the flexible throat 502 coupled to the flexible shoulder 504, which mates 506 to itself.

Figure 4C:
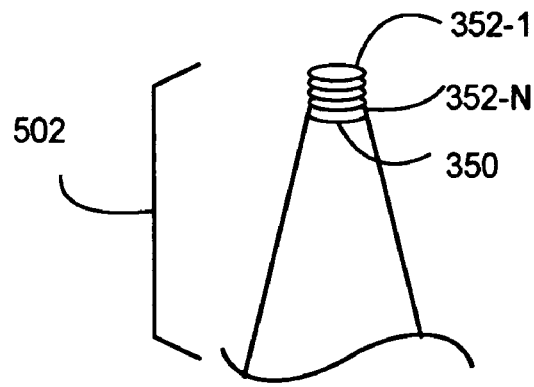
FIG. 4C, the flexible throat of FIGS. 4A and 4B including multiple external threads.

FIG. 4C, the flexible throat 502 of FIGS. 4A and 4B including multiple external threads 352-1 to 352-N.

FIGS. 5A to 9D show various embodiments of the collapsible tubes similar to FIG. 4B. FIGS. 5A to 9D show at least a first break 600 forming various columns in the radial axis of the flexible throat 502.

Figure 5C:
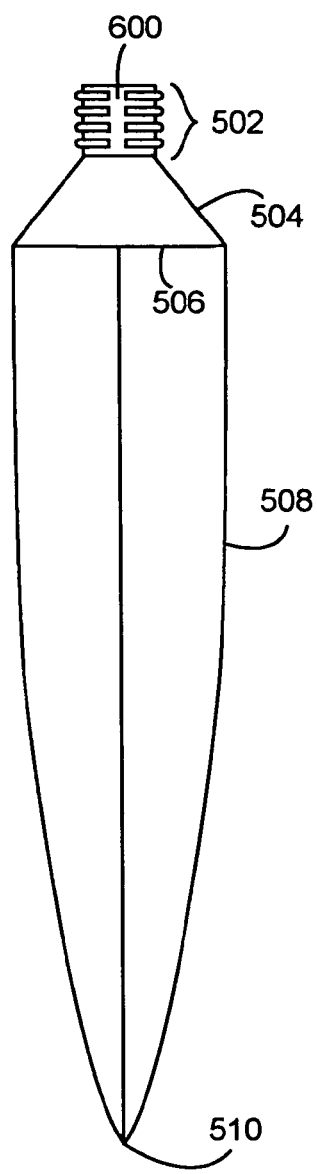
FIG. 5C shows a side view of the collapsible tube in FIG. 5A with the first break forming rectangular column.

FIG. 5A shows a top view of a collapsible tube as in FIG. 4B showing a first break 600 forming a canted column. FIG. 5B shows a front view of the collapsible tube in FIG. 5A showing a first break 600 and a second break 602. FIG. 5C shows a side view of the collapsible tube in FIG. 5A with the first break 600 forming rectangular column.

Figure 5D:
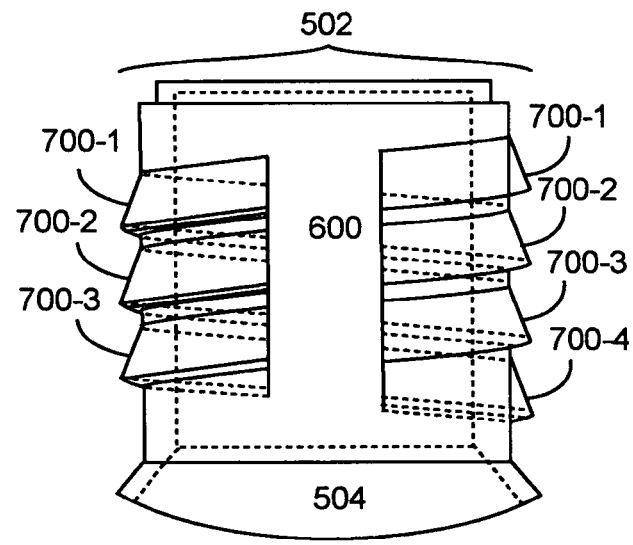
FIG. 5D shows a detail of FIG. 5C showing the flexible throat with a thread form including at least two, and in this case four open threads, which could be by way of example, external acme threads, external buttress threads, external V threads, external box threads, or combinations or modifications of these well known open threads.

FIG. 5D shows a detail of FIG. 5C showing the flexible throat 502 with a thread form including at least two, and in this case four threads. These threads may include open threads, ridged threads, or combinations of open threads and ridged thread. The open threads could be, by way of example, external acme threads, external buttress threads, external V threads, external box threads, or combinations or modifications of these well known open threads. The ridged threads are defined and shown in many examples throughout this document.

Figure 5E:
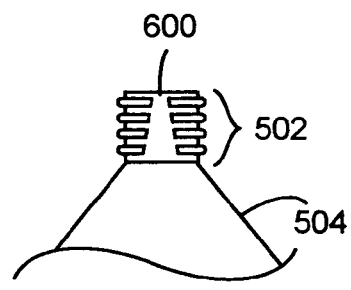
FIG. 5E shows the first break forming a fluted column expanding toward the flexible shoulder.

FIG. 5E shows the first break 600 forming a fluted column expanding toward the flexible shoulder.

Figure 5F:
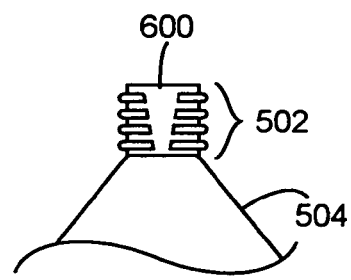
FIG. 5F shows the first break 600 forming a fluted column expanding away from the flexible shoulder.

FIG. 5F shows the first break 600 forming a fluted column expanding away from the flexible shoulder.

Figure 5G:
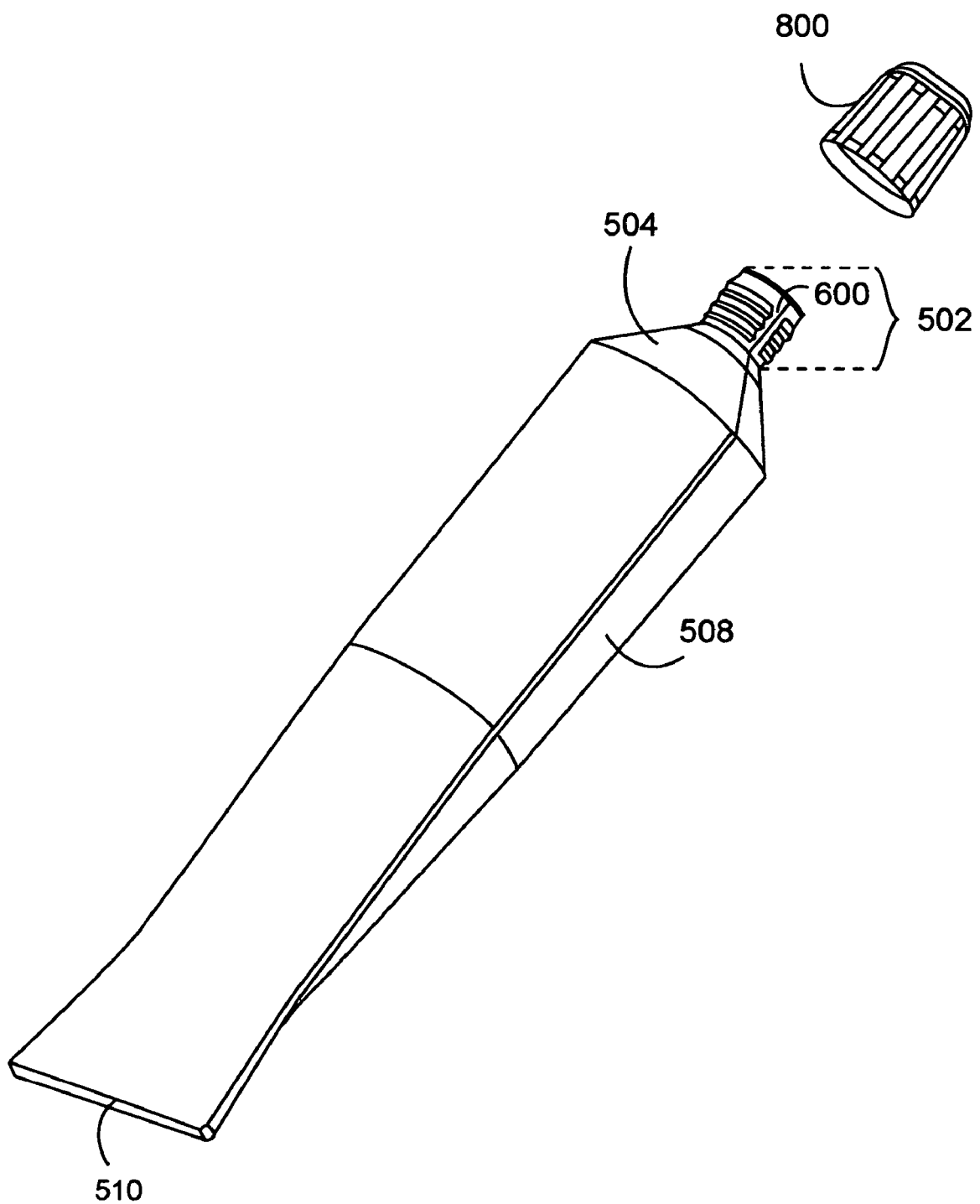
FIG. 5G shows the collapsible tube as in FIGS. 5B to 5D with a cap.

FIG. 5G shows the collapsible tube as in FIGS. 5B to 5D with a cap 800.

Figure 5I:
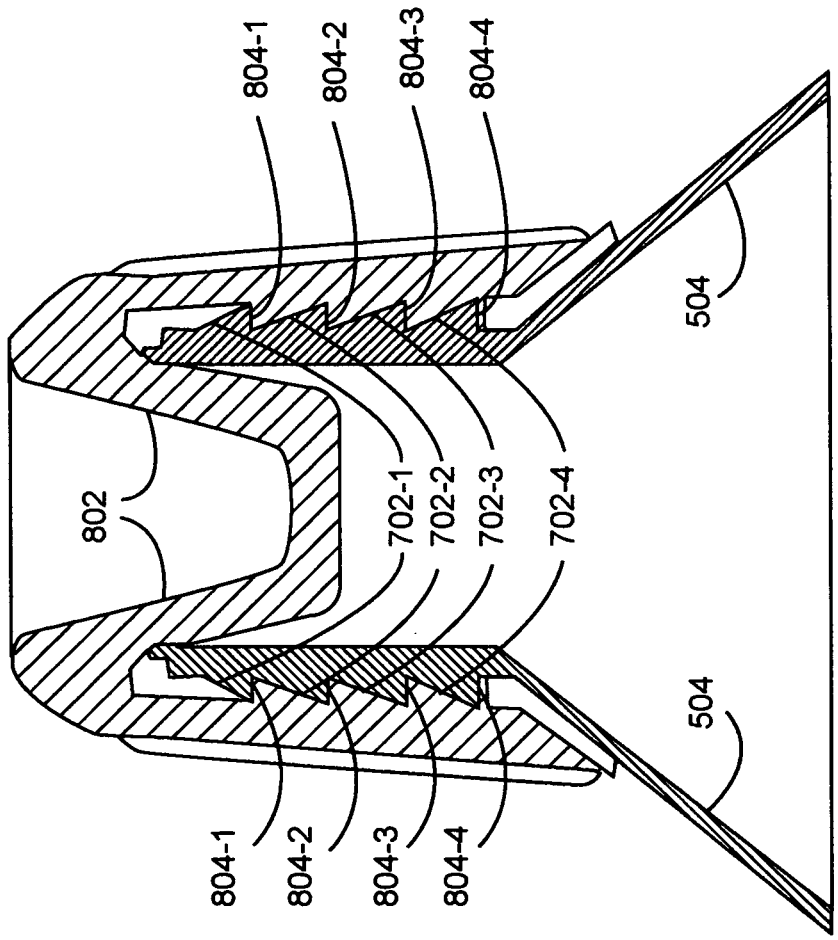
FIG. 5I shows a cross section of FIG. 5H of the collapsible shoulder, flexible throat engaging the internal thread form and the external thread form using buttress threads.
Figure 5H:
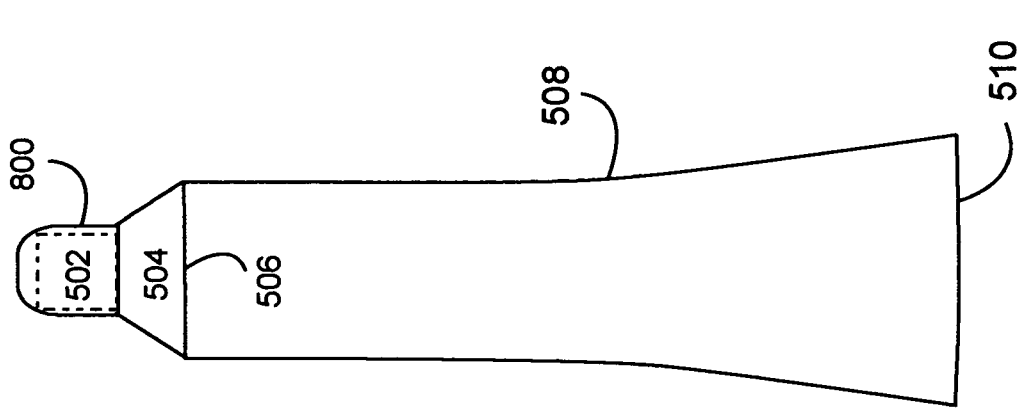
FIG. 5H shows the collapsible tube of FIG. 5G with the cap engaged and filled contents.

FIG. 5H shows the collapsible tube of FIG. 5G with the cap 800 engaged and filled with at least one content.

FIG. 5I shows a cross section of FIG. 5H of the collapsible shoulder 504, flexible throat 502 engaging the internal thread form and the external thread form. The internal thread form includes internal buttress threads 804-1 to 804-4. The external thread form includes external buttress threads 702-1 to 702-4. The internal thread form and the external thread form collectively urge the cap 800 and the flexible throat 502 to seal the contained product into the collapsible tube. The cap 800 further, preferably includes an interior bulge 802 which acts upon the flexible throat 502 to urge the flexible throat 502 to engage the internal thread form and the external thread form.

As shown and discussed herein, the threads on the flexible throat 502, the flexible shoulder 504, and when applicable, the collapsible tube body 506, and the flexible cone 520, are preferably made of flexible materials. These flexible materials include, but are not limited to, at least one flexible thermoset elastomeric and/or flexible thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. An elastomeric plastic is typically a polymer blend or compound, which above its melting temperature, exhibits a thermoplastic behavior enabling it to be shaped into a fabricated article, such as a collapsible tube or cap. When the article is within its design temperature range, it exhibits elastomeric behavior without cross-linking during fabrication. The fabrication process is reversible. The article can be reprocessed and remolded. The method of making these collapsible tubes 500 may include, but is not limited to, using a mold, into which the material(s) are injected and/or blown. The material may be injected one or more times. When material is injected more than one time, the process is often known as a multi-shot molding. The ridged thread forms may preferably be bumped or unscrewed from the mold(s).

In FIGS. 5I, 5K 5L, 10A, and 10B, the internal thread form slides along the external thread form, and the external thread form slides along the internal thread form to slide along each other, when the internal thread form and the external thread form engage. After they engage, continued sliding causes the internal thread form and the external thread form to lock, sealing the contained product into the collapsible tube.

One skilled in the art will recognize that various bumps and ridges in the cap and throat may be used to enhance engagement. As used herein the engagement enhancing bumps and ridges are not part of the screw sliding operations.

Figure 5K:
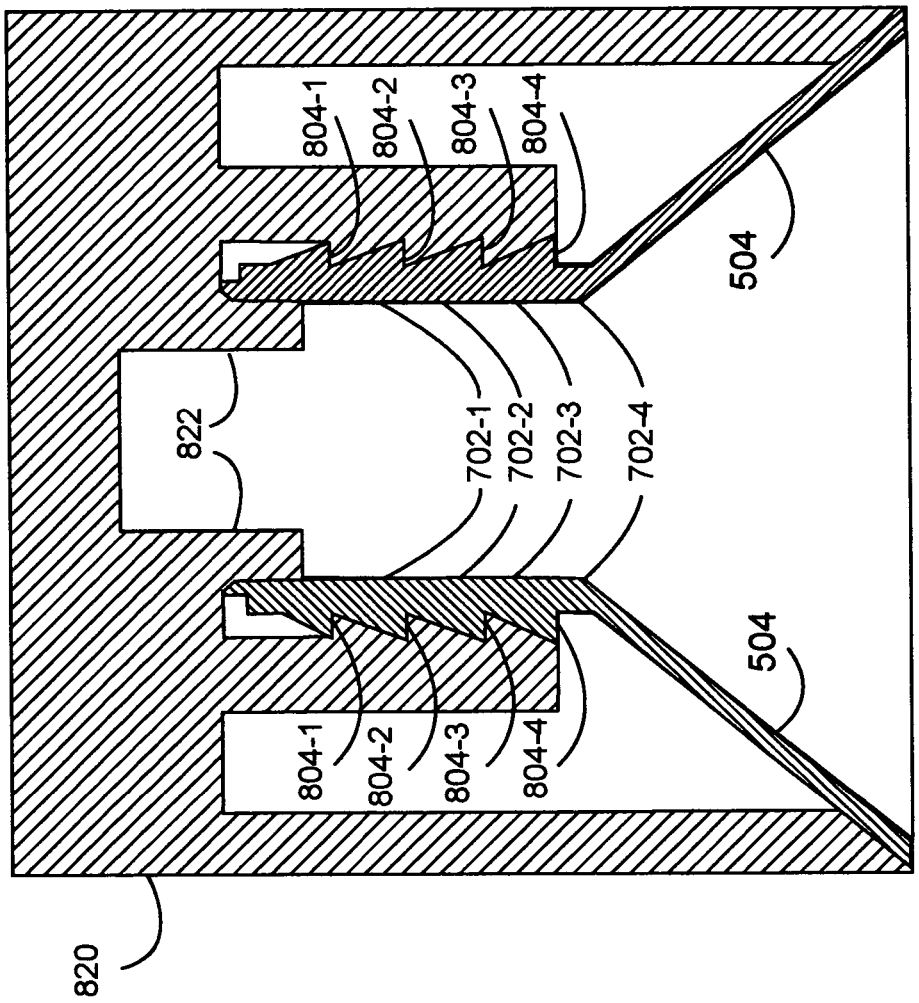
FIG. 5K shows a cross section of FIG. 5J with the collapsible shoulder and flexible throat of FIG. 5I engaging a hollow version of the second cap.
Figure 5J:
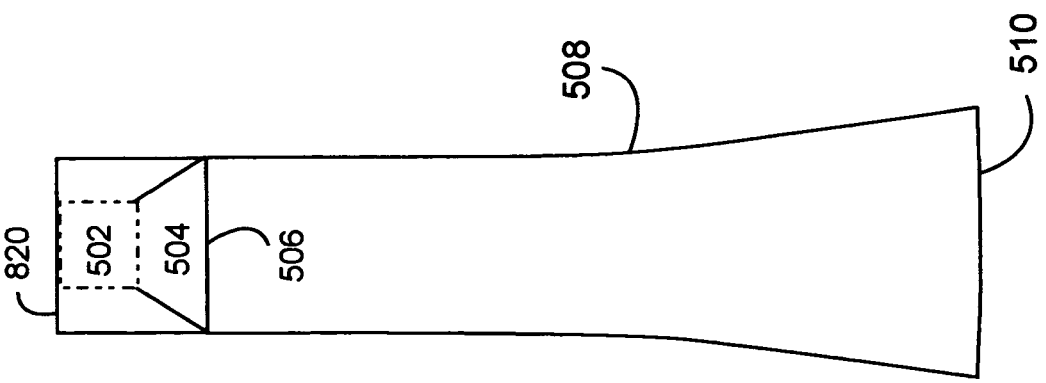
FIG. 5J shows the collapsible tube of FIG. 5G with a second cap engaged and filled with contents.
Figure 5L:
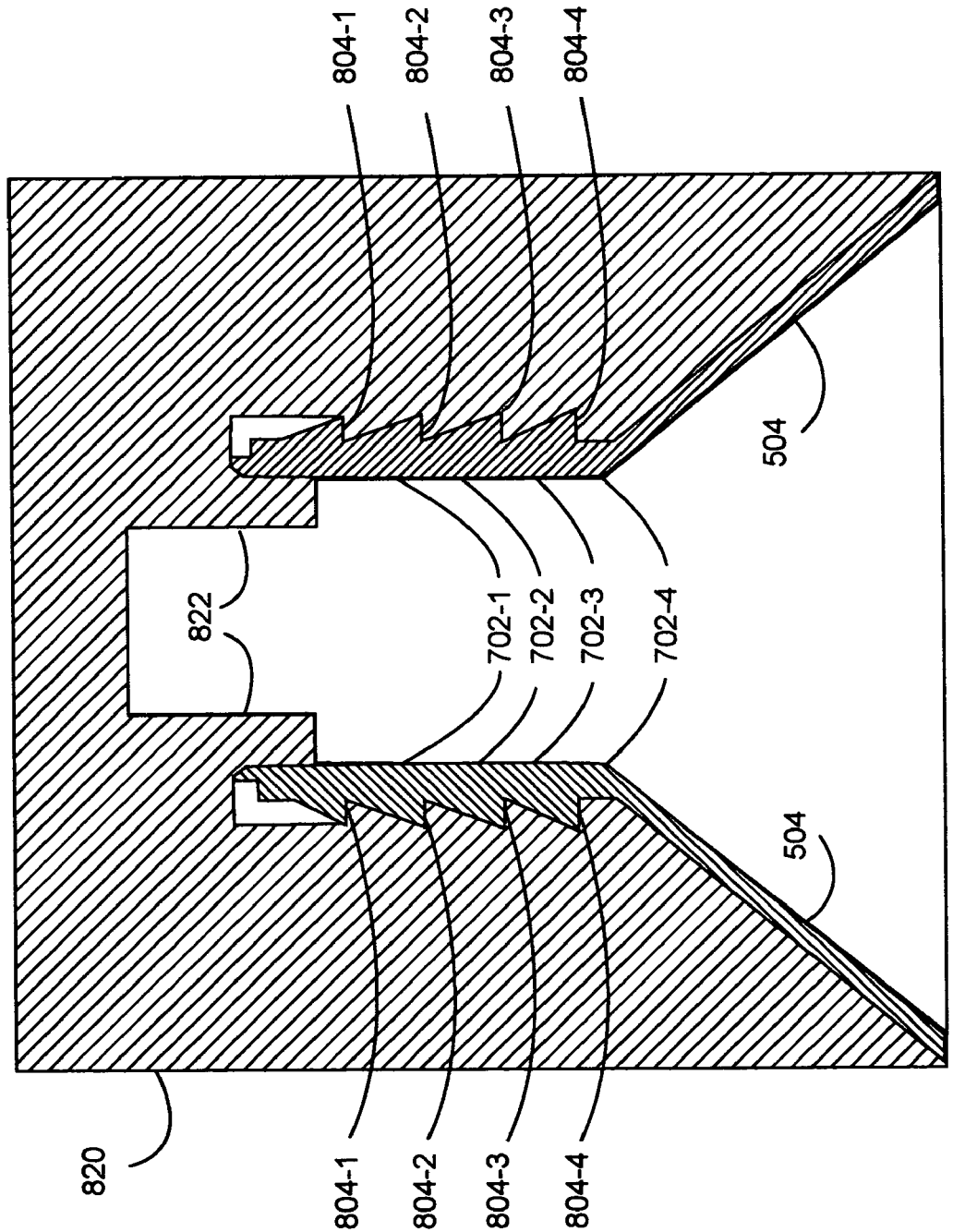
FIG. 5L shows a cross section of FIG. 5J with the collapsible shoulder and flexible throat of FIG. 5I engaging a filled version of the second cap.

FIG. 5J shows the collapsible tube of FIG. 5G with a second cap 820 engaged and filled with contents. FIG. 5K shows a cross section of FIG. 5J with the collapsible shoulder 504 and flexible throat 502 of FIG. 5I engaging a hollow version of the second cap 820. FIG. 5L shows a cross section of FIG. 5J with the collapsible shoulder 504 and flexible throat 502 of FIG. 5I engaging a filled version of the second cap 820. Note the interior rim 822 included in the second cap 820 may preferably extend to below at least the first external thread 804-1 to aid in urging the reforming of the flexible throat 502. It may further preferred that the interior rim 822 extend below the second external thread 804-2, etc. One skilled in the art will recognize that many variations in the caps 820 and 800 are preferred in different situations, causing variation in at least their size, shape, number of threads, and whether or not they are hollow.

FIGS. 6A to 6D show the front view of a collapsible tube with none, one, two, and three breaks in its external threads, respectively.

FIGS. 7A to 7D shows the front view of the collapsible tubes of FIGS. 6A to 6D partially deformed by squeezing the collapsible tube bodies 506 and flexible shoulders 504.

Figure 6A:
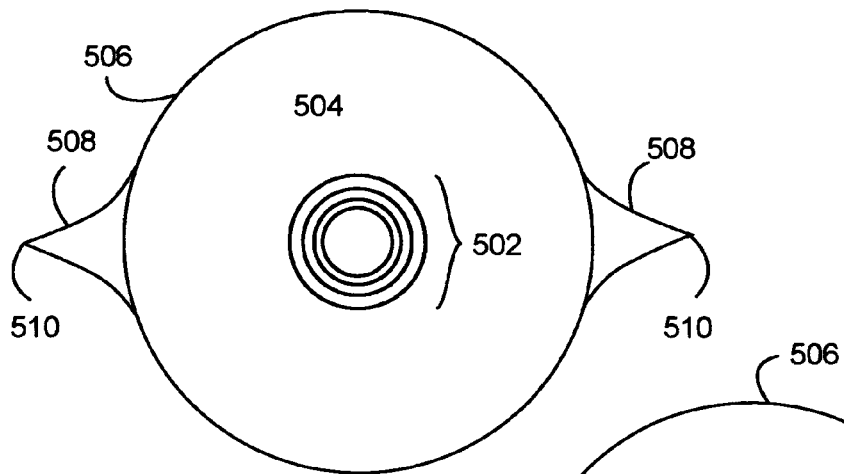
FIGS. 6A to 6D show the front view of a collapsible tube with none, one, two, and three breaks in its external threads, respectively.
Figure 6B:
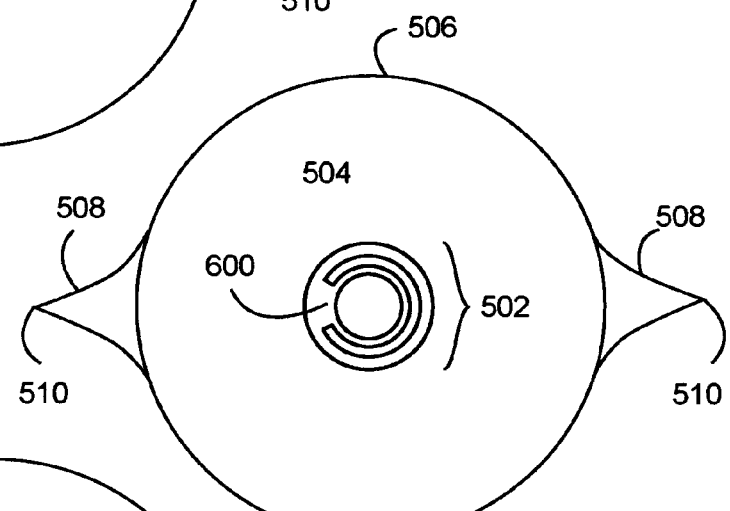
Figure 7A:
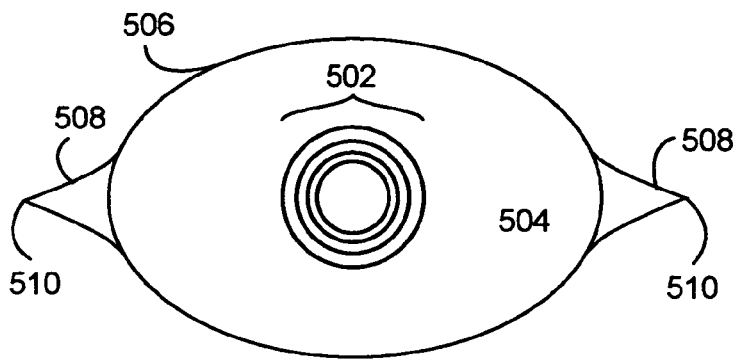
FIGS. 7A to 7D shows the front view of the collapsible tubes of FIGS. 6A to 6D partially deformed by squeezing the collapsible tube bodies and flexible shoulders.
Figure 7B:
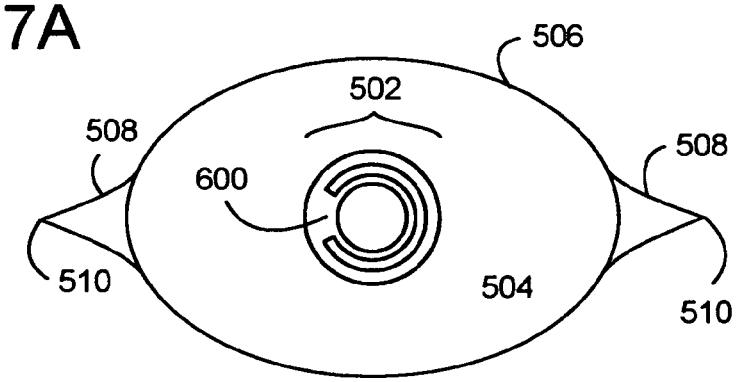

FIGS. 8A to 8D show the further squeezing of the collapsible tube of FIGS. 6A and 7A, which has no breaks in its external threads.

Figure 6C:
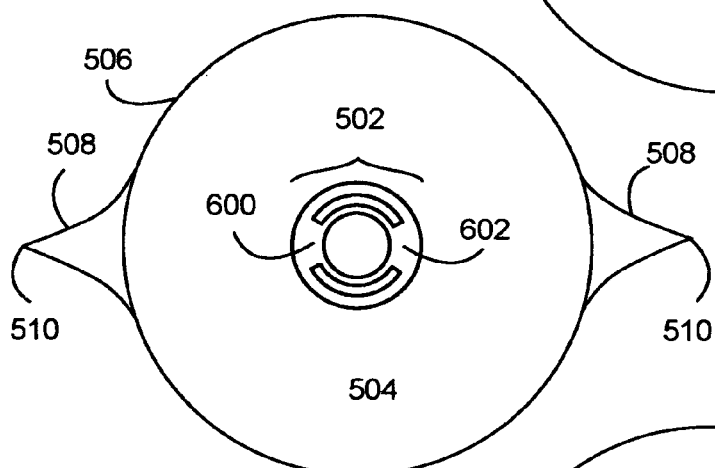
Figure 6D:
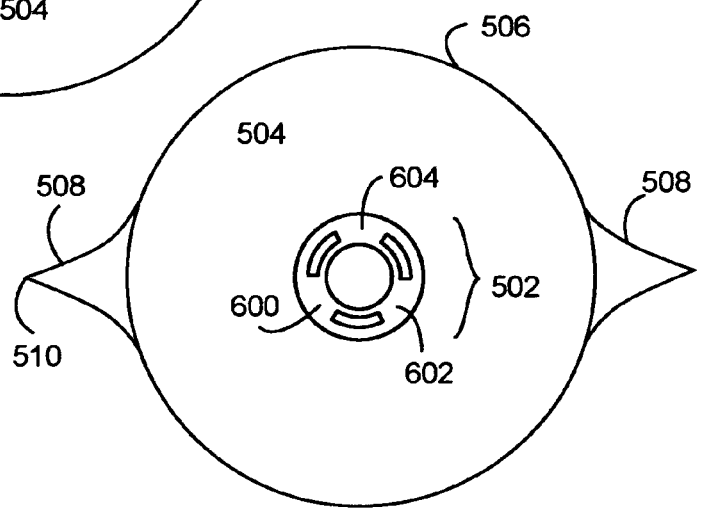
Figure 7C:
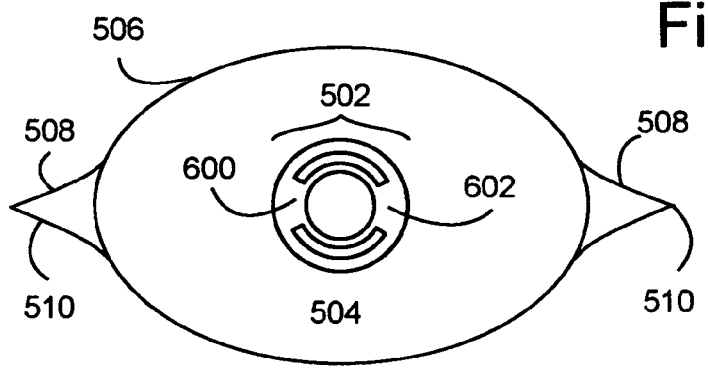
Figure 7D:
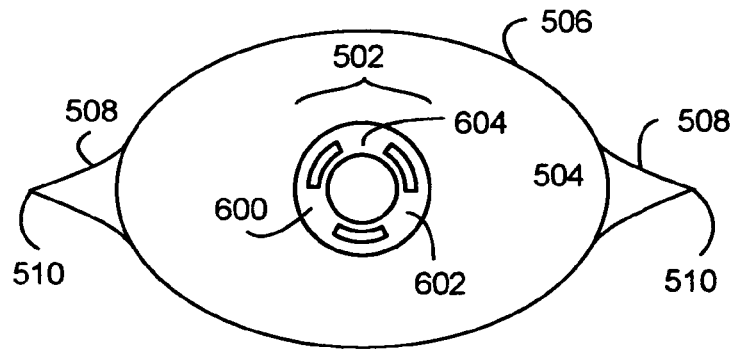
Figure 8A:
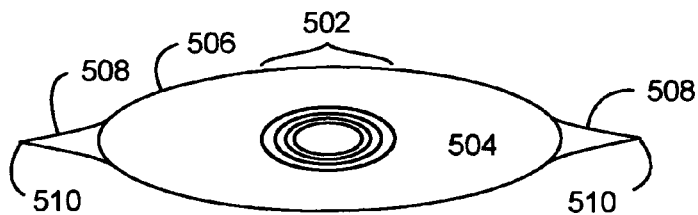
FIGS. 8A to 8D show the further squeezing of the collapsible tube of FIGS. 6A and 7A, which has no breaks in its external threads.
Figure 8B:
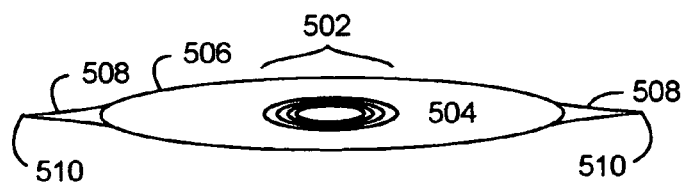
Figure 8C:
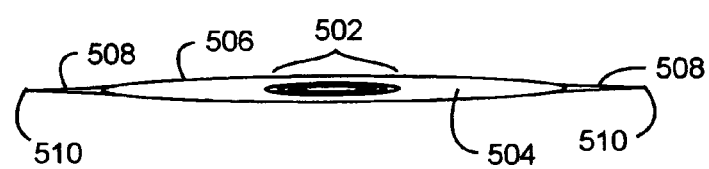
Figure 8D:
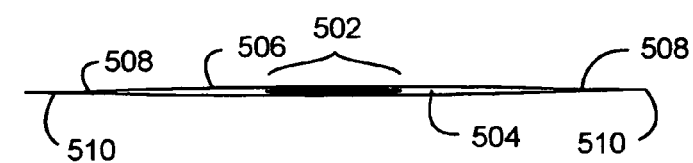
Figure 8E:
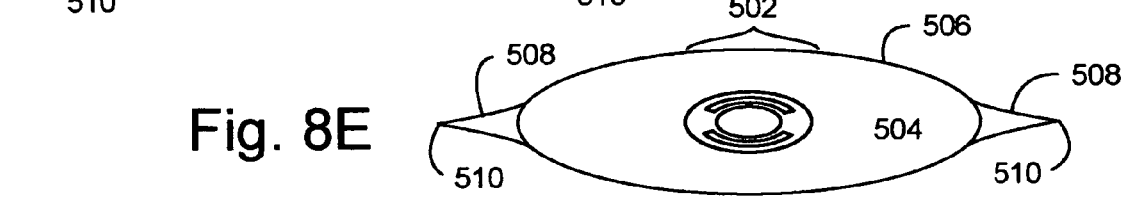
FIGS. 8E to 8H show the further squeezing of the collapsible tube of FIGS. 6C and 7C, which has a first break and a second break.
Figure 8F:
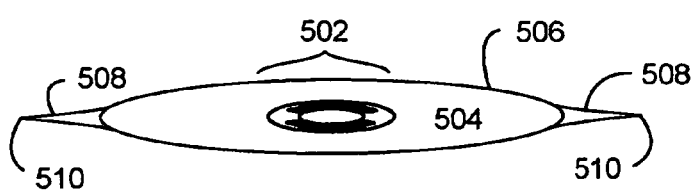
Figure 8G:
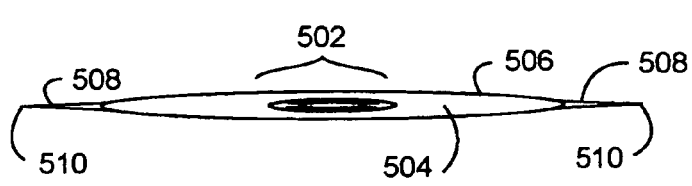
Figure 8H:
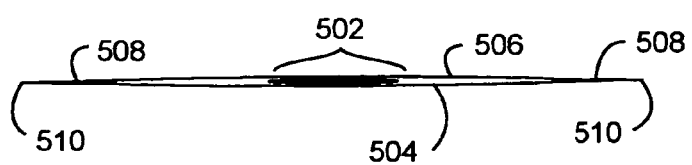
Figure 9A:
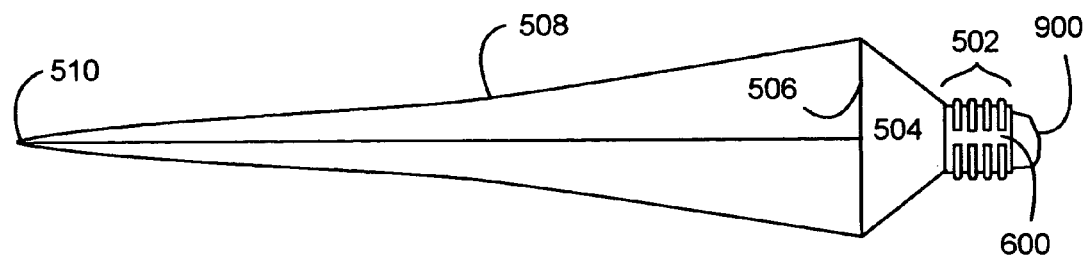
FIGS. 9A to 9D show the side view of the squeezing of the collapsible tube shown in FIGS. 7C, and 8E to 8H, with the contained product being dispensed.
Figure 9B:
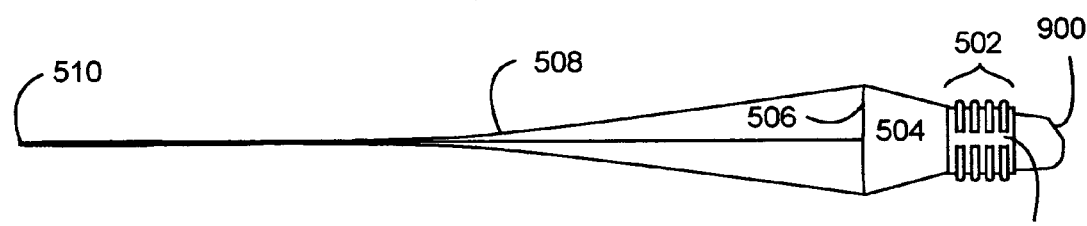
Figure 9C:
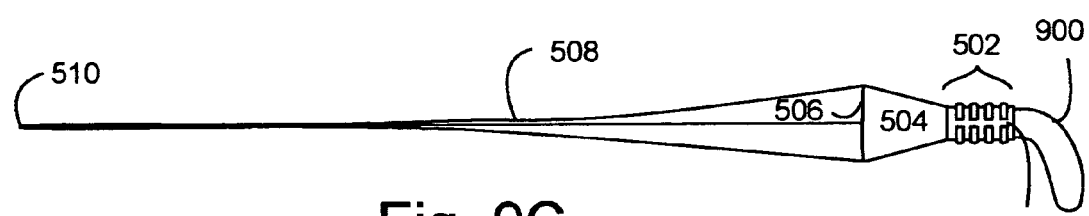
Figure 9D:
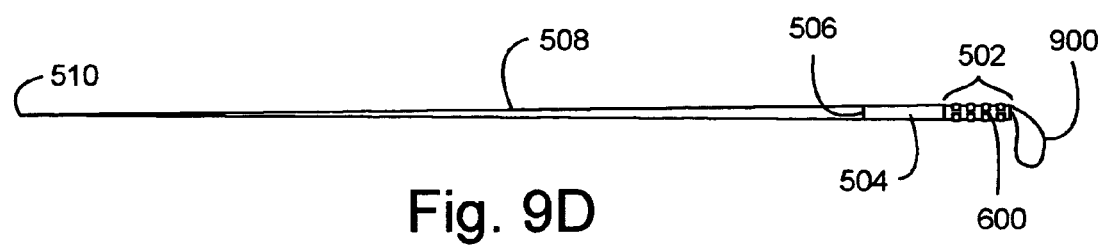

FIGS. 8E to 8H show the further squeezing of the collapsible tube of FIGS. 6C and 7C, which has a first break 600 and a second break 602.

FIGS. 9A to 9D show the side view of the squeezing of the collapsible tube shown in FIGS. 7C, and 8E to 8H, with the contained product 900 being dispensed.

This method of using a collapsible tube permits dispensing essentially all of the contained product. The contained product may be any of the following: a pharmaceutical, a personal care product, a toothpaste, a food, an artist's paint, a glue, a hazardous chemical, a grease product, and/or a viscous plastic.

Substances will be referred to herein as viscous plastics when they are viscous enough to be pressed out of a collapsible squeeze tube to form a blob or a line for various purposes, such as caulk or other sealants, compounds used to create a braille letter, or other identifying mark on items for the blind, or decorative substances that are not simply paint but create texture and mass when applied, or compounds that dry when exposed to air forming durable shapes, marks, seals, decorations, and the like.

The collapsible tube 500 may have the tube closure 510, repeatedly opened and sealed shut by using a mechanical device (sometimes known as a key). Versions of a key typically include a plastic cylinder with a slit in its center that slides over the open end of the tube, rolls toward the flexible throat 504 of the collapsible tube 500 to seal the tube closure 510, and locks itself in the closed position.

FIGS. 10A and 10B show two implementations of a collapsible tube 500 including a flexible cone 520 narrowing from the flexible throat 502 away from the flexible shoulder 504 and including a narrow opening 522 for dispensing essentially all of a contained product (which is not shown).

In FIG. 10A, the flexible throat 504 has a thread form which includes a first external ridged thread 356-1 and a second external ridged thread 356-2, which match the first internal ridged thread 306-1 and the second internal ridged thread 306-2. The cap 840 includes the first internal ridged thread 306-1 and the second internal ridged thread 306-2.

In FIG. 10B, the flexible throat 504 has a thread form which includes a first external open thread 706-1 and a second external open thread 706-2, which match the first internal open thread 806-1 and the second internal open thread 806-2. The cap 840 includes the first internal ridged thread 806-1 and the second internal ridged thread 806-2.

The collapsible tube 500 shown in the preceding Figures may preferably be made of at least one flexible thermoset elastomeric and/or flexible thermoplastic elastomer. Elastomeric include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap to which the flexible threads mate may also be manufactured using existing collapsible tube manufacturing technology and materials.

The cap 800, the cap 820, and the cap 300 shown in the preceding Figures may preferably be made of at least one rigid thermoset elastomeric and/or thermoplastic elastomer. Elastomeric plastics include, but not limited to, urethane, polyvinyl chloride, ThermoPlastic elastomer Olefin (TPO), Thermal PolyVinyl chloride (TPV), ThermoPlasRubber (TPR) and/or Silicone based compounds. The cap to which the flexible threads mate may also be manufactured using existing cap molding technology and materials. The interior bulge 802 on the cap that inserts into the flexible throat 502 may also be a standard cap design. The interior rim 822 on the cap that inserts into the flexible throat 502 may also be a standard cap design. These caps may also be made from conventional cap materials.

There are two manufacturing options for a cap with ridged threads, such as cap 300. The ridged thread cap may be made of a flexible material, molded using a special process allowing the delicate uniquely shaped interior ridged threads to be popped or bumped off the mold, or unscrewed from the mold.

Alternatively, the ridged thread cap may be made of a standard rigid material, or a slightly flexible material, with the uniquely shaped interior ridged threads bonded to the ridged thread cap via a second injection into the mold of a different material. This form of injection molding is often referred to as "co-molding" and allows for a molded product with two distinctly different types of material to be manufactured. An example is the rigid toothbrush with a squeezable grip on its handle commonly found in supermarkets. This type of molding is extremely expensive because custom molds and tools must be created to allow for multiple shots of plastic to be injected with precision. The first shot forms a cap in any rigid shape suitable for injection molding. The second shot is of a flexible plastic which forms the threads of the ridged thread cap in a continuous or interrupted pattern, which threads engage with the tube tip's flexible, ridged threads, forming a seal. The rigid or semi-rigid ring on the under side of the ridged thread cap, as in the first rigid cap case, will help to re-form the cylindrical shape of the flexible tube tip.

The preceding embodiments have been provided by way of example and are not meant to constrain the scope of the following claims.

What is claimed is:

1. A method of using a cap containing an internal thread form matching an external thread form on a flexible throat for a collapsible tube enclosing at least one contained product, comprising the steps of:
   twisting said cap to engage said internal thread form and said external thread form, which collectively urge said cap and said flexible throat to seal said contained product into said collapsible tube; and
   deforming said flexible throat through squeezing said collapsible tube dispenses essentially all of said contained product;
   wherein said external thread form on said flexible throat includes at least one break;
   wherein all of said breaks form rectangular columns in the radial axis of said flexible throat;
   wherein the step deforming said flexible throat further comprises the step of:
   said flexible throat bending near said break to aid dispensing said essentially all of said contained product.

2. The method of claim 1, wherein said external thread form on said flexible throat includes at least two of said breaks;
   wherein the step deforming said flexible throat further comprises the steps of:
   said flexible throat bending near said break to aid dispensing said essentially all of said contained product, for at least two of said breaks.

3. The method of claim 2, wherein the step deforming said flexible throat further comprises the steps of:
   said flexible throat bending near said break to aid dispensing said essentially all of said contained product, for each of said breaks.

4. The method of claim 2, wherein said external thread form on said flexible throat includes at least three of said breaks.

5. The method of claim 1, wherein said internal thread form and said external thread form an open thread.

6. The method of claim 5, wherein said internal thread form and said external thread form involve at least one of essentially an acme thread pattern, a buttress thread pattern, a V thread pattern and a box thread pattern.

7. The method of claim 6, wherein said internal thread form and said external thread form involves at least one of:
   exactly one of said acme thread pattern, said buttress thread pattern, said V thread pattern, and said box thread pattern;
   a combination of at least two of said acme thread pattern, said buttress thread pattern, said V thread pattern, and said box thread pattern; and
   a modification of at least one of said acme thread pattern, said buttress thread pattern, said V thread pattern, and said box thread pattern.

8. The method of claim 1, wherein said internal thread form contains at least one ridged internal thread; and wherein said external thread form includes at least one ridged external thread.

9. The method of claim 8, wherein the step twisting said cap is further comprised of the steps of:
   said internal thread form slides along said external thread form, and said external thread form slides along said internal thread form to slide along each other, when said internal thread form and said external thread form engage; and
   said internal thread form and said external thread form lock to seal said contained product into said collapsible tube, while said internal thread form and said external thread form slide along each other.

10. The method of claim 9, wherein the step twisting said cap is further comprised of at least one of the steps of:
    said internal thread form and said external thread form providing an additional force acting upon said internal thread form in the direction of the radial axis of said cap, when said internal thread form and said external thread form engage; and
    said internal thread form and said external thread form providing said additional force acting upon said external thread form in the direction of the radial axis of said cap, when said internal thread form and said external thread form engage.

11. The method of claim 10, wherein the step twisting said cap further comprises the step of:
    said additional force urging said internal thread form and said external thread to seal said contained product into said collapsible tube.

12. The method of claim 9, wherein said internal thread form is essentially rigid.

13. The method of claim 12, wherein the step twisting said cap further comprises the step of:
    engaging said internal thread form and said external thread urges said flexible throat to conform to the overall shape of the interior of said cap.

14. The method of claim 8, wherein the step deforming said flexible throat is further comprised of the step of:
    deforming said flexible throat through squeezing said collapsible tube to dispense essentially all of said contained product.

15. The method of claim 1, wherein said collapsible tube contains at least two contained products.

16. The method of claim 1, wherein said contained product is a pharmaceutical product.

17. The method of claim 1, wherein said contained product is a personal care product.

18. The method of claim 1, wherein said contained product is a paint product.

19. The method of claim 1, wherein said contained product is a toothpaste product.

20. The method of claim 1, wherein said contained product is a food product.

21. The method of claim 1, wherein said contained product is a glue product.

22. The method of claim 1, wherein said contained product is a hazardous chemical.

23. The method of claim 1, wherein said contained product is a grease product.

24. The method of claim 1, wherein said contained product is a viscous plastic.

25. The method of claim 1, wherein said collapsible tube is further comprised of said flexible throat coupled to a flexible shoulder mating to a collapsible tube body.

26. The method of claim 25, wherein the step deforming said flexible throat through squeezing said collapsible tube is further comprised of the step of:
    wherein deforming said flexible throat through squeezing said flexible shoulder and said collapsible tube tends to flatten said flexible throat and said flexible shoulder to dispense essentially all of said product.

27. The method of claim 1, wherein said collapsible tube includes a flexible cone narrowing from said flexible throat away from said flexible shoulder including a narrow opening to dispense essentially all of said product.

28. The method of claim 27, wherein the step deforming said flexible throat through squeezing said collapsible tube is further comprised of the step of:
   wherein deforming said flexible cone through squeezing said flexible throat and said flexible shoulder tends to flatten said flexible cone, said flexible throat, and said flexible shoulder to dispense essentially all of said product.

29. A collapsible tube for containing at least one product, comprising:
   an external thread form on a flexible throat coupled to a flexible shoulder;
   wherein said external thread form mates to a cap with an internal thread form urging said flexible throat to seal against said cap when said cap is twisted onto said flexible throat; and
   wherein said flexible throat and said flexible shoulder flatten to dispense essentially all of said product;
   wherein said external thread form further comprises:
   at least two external threads, each of said external threads possessing at least one break;
   wherein all of said breaks of all of said external threads form at least one column in the radial axis of said flexible throat;
   wherein all of said breaks form rectangular columns in the radial axis of said flexible throat.

30. The collapsible tube of claim 29, further comprising:
   said flexible shoulder mating to a collapsible tube body;
   wherein said flexible throat and said flexible shoulder flatten with said collapsible tube body to dispense essentially all of said product.

31. The collapsible tube of claim 29, further comprising: said flexible shoulder mating to itself.

32. The collapsible tube of claim 29, wherein each of said external threads possesses exactly one break.

33. The collapsible tube of claim 29, wherein each of said external threads possesses exactly two breaks.

34. The collapsible tube of claim 29, wherein each of said external threads possesses exactly three breaks.

35. The collapsible tube of claim 29, wherein each of said external threads possesses exactly four breaks.

36. The collapsible tube of claim 29, wherein said external thread form comprises at least two external open threads.

37. The collapsible tube of claim 29, wherein said external open thread involves at least one of essentially an external acme thread, an external buttress thread pattern, an external V thread and an external box thread.

38. The collapsible tube of claim 37, said external open thread involves at least one of the following:
   exactly one of said external acme thread, said external buttress thread, said external V thread, and said external box thread;
   a combination of at least two of said external acme thread, said external buttress thread, said external V thread, and said external box thread; and
   a modification of at least one of said external acme thread, said external buttress thread, said external V thread, and said external box thread.

39. The collapsible tube of claim 29, wherein said external thread form comprises a first external ridged thread and a second external ridged thread.

40. The collapsible tube of claim 39, wherein said first external ridged thread is essentially the same as said second external ridged thread.

41. The collapsible tube of claim 39, wherein said first external ridged thread differs from said second external ridged thread.

42. The collapsible tube of claim 39, wherein said first external ridged thread is essentially the same as said third external ridged thread form.

43. The collapsible tube of claim 42, wherein said first external ridged thread is essentially the same as said second external ridged thread form.

44. The collapsible tube of claim 42, wherein said first external ridged thread differs from said second external ridged thread form.

45. The collapsible tube of claim 29, wherein said collapsible tube contains at least two contained products.

46. The collapsible tube of claim 29, wherein said contained product is a pharmaceutical product.

47. The collapsible tube of claim 29, wherein said contained product is a personal care product.

48. The collapsible tube of claim 29, wherein said contained product is a paint product.

49. The collapsible tube of claim 29, wherein said contained product is a toothpaste product.

50. The collapsible tube of claim 29, wherein said contained product is a food product.

51. The collapsible tube of claim 29, wherein said contained product is a glue product.

52. The collapsible tube of claim 29, wherein said contained product is a hazardous chemical.

53. The collapsible tube of claim 29, wherein said contained product is a grease product.

54. The collapsible tube of claim 29, wherein said contained product is a viscous plastic.

55. Said cap of claim 29, comprising one of:
   an interior bulge to act upon said flexible throat to urge said flexible throat to engage said internal thread form and said external thread form; and
   an interior rim to act upon said flexible throat to urge said flexible throat to engage said internal thread and said external thread form.

56. Said cap of claim 55, wherein said cap is not flexible.

57. Said cap of claim 56, wherein said cap is rigid.

58. The collapsible tube of claim 29, further comprising:
   a flexible cone narrowing from said flexible throat away from said flexible shoulder including a narrow opening to dispense essentially all of said product.

59. A collapsible tube for containing at least one product, comprising:
   an external thread form on a flexible throat coupled to a flexible shoulder;
   wherein said external thread form mates to with an internal thread form urging said flexible throat to seal against said cap when said cap is twisted onto said flexible throat;
   wherein said flexible throat and said flexible shoulder flatten to dispense essentially all of said product;
   wherein said external thread form further comprises: at least two external threads, each of said external threads possessing at least one break; and
   wherein all of said breaks of all of said external threads form at least one column in the radial axis of said flexible throat;
   wherein all of said breaks form rectangular columns in the radial axis of said flexible throat.

60. The collapsible tube of claim 59, further comprising:
   said flexible shoulder mating to a collapsible tube body;
   wherein said flexible throat and said flexible shoulder flatten with said collapsible tube body to dispense essentially all of said product.

61. The collapsible tube of claim 59, further comprising: said flexible shoulder mating to itself.

62. The collapsible tube of claim 59, wherein each of said external threads possesses exactly one break.

63. The collapsible tube of claim 59, wherein each of said external threads possesses exactly two breaks.

64. The collapsible tube of claim 59, wherein each of said external threads possesses exactly three breaks.

65. The collapsible tube of claim 59, wherein each of said external threads possesses exactly four breaks.

66. The collapsible tube of claim 59, wherein said external thread form comprises at least two external open threads.

67. The collapsible tube of claim 59, wherein said external open thread is at least one of an acme external thread, a buttress external threads, and a box external thread.

68. The collapsible tube of claim 59, wherein said external thread form comprises a first external ridged thread and a second external ridged thread.

69. The collapsible tube of claim 68, wherein said first external ridged thread is essentially the same as said second external ridged thread.

70. The collapsible tube of claim 68, wherein said first external ridged thread differs from said second external ridged thread.

71. The collapsible tube of claim 68, wherein said first external ridged thread is essentially the same as said third external ridged thread form.

72. The collapsible tube of claim 71, wherein said first external ridged thread is essentially the same as said second external ridged thread form.

73. The collapsible tube of claim 71, wherein said first external ridged thread differs from said second external ridged thread form.

74. The collapsible tube of claim 59, wherein said collapsible tube contains at least two contained products.

75. The collapsible tube of claim 59, wherein said contained product is a pharmaceutical product.

76. The collapsible tube of claim 59, wherein said contained product is a personal care product.

77. The collapsible tube of claim 59, wherein said contained product is a paint product.

78. The collapsible tube of claim 59, wherein said contained product is a toothpaste product.

79. The collapsible tube of claim 59, wherein said contained product is a food product.

80. The collapsible tube of claim 59, wherein said contained product is a glue product.

81. The collapsible tube of claim 59, wherein said contained product is a hazardous chemical.

82. The collapsible tube of claim 59, wherein said contained product is a grease product.

83. The collapsible tube of claim 59, wherein said contained product is a viscous plastic.

84. Said cap of claim 59, comprising one of:
an interior bulge to act upon said flexible throat to urge said flexible throat to engage said internal thread form and said external thread form; and
an interior rim to act upon said flexible throat to urge said flexible throat to engage said internal thread and said external thread form.

85. Said cap of claim 84, wherein said cap is not flexible.

86. Said cap of claim 85, wherein said cap is rigid.

87. The collapsible tube of claim 59, further comprising:
a flexible cone narrowing from said flexible throat away from said flexible shoulder including a narrow opening to dispense essentially all of said product.

88. A collapsible tube for containing at least one product, comprising:

an external thread form on a flexible throat coupled to a flexible shoulder;
wherein said external thread form mates to a cap with an internal thread form urging said flexible throat to seal against said cap when said cap is twisted onto said flexible throat;
wherein said flexible throat and said flexible shoulder flatten to dispense essentially all of said product; and
wherein said external thread form comprises a first external ridged thread and a second external ridged thread;
wherein said external thread form further comprises:
at least two external threads, each of said external threads possessing at least one break;
wherein all of said breaks of all of said external threads form at least column in the radial axis of said flexible throat;
wherein all of said breaks form rectangular columns in the radial axis of said flexible throat.

89. The collapsible tube of claim 88, further comprising:
said flexible shoulder mating to a collapsible tube body;
wherein said flexible throat and said flexible shoulder flatten with said collapsible tube body to dispense essentially all of said product.

90. The collapsible tube of claim 88, further comprising:
said flexible shoulder mating to itself.

91. The collapsible tube of claim 88, wherein each of said external threads possesses exactly one break.

92. The collapsible tube of claim 88, wherein each of said external threads possesses exactly two breaks.

93. The collapsible tube of claim 88, wherein each of said external threads possesses exactly three breaks.

94. The collapsible tube of claim 88, wherein each of said external threads possesses exactly four breaks.

95. The collapsible tube of claim 88, wherein said first external ridged thread is essentially the same as said second external ridged thread.

96. The collapsible tube of claim 88, wherein said first external ridged thread differs from said second external ridged thread.

97. The collapsible tube of claim 88, wherein said first external ridged thread is essentially the same as said third external ridged thread form.

98. The collapsible tube of claim 97, wherein said first external ridged thread is essentially the same as said second external ridged thread form.

99. The collapsible tube of claim 97, wherein said first external ridged thread differs from said second external ridged thread form.

100. The collapsible tube of claim 88, wherein said collapsible tube contains at least two contained products.

101. The collapsible tube of claim 88, wherein said contained product is a pharmaceutical product.

102. The collapsible tube of claim 88, wherein said contained product is a personal care product.

103. The collapsible tube of claim 88, wherein said contained product is a paint product.

104. The collapsible tube of claim 88, wherein said contained product is a toothpaste product.

105. The collapsible tube of claim 88, wherein said contained product is a food product.

106. The collapsible tube of claim 88, wherein said contained product is a glue product.

107. The collapsible tube of claim 88, wherein said contained product is a hazardous chemical.

108. The collapsible tube of claim 88, wherein said contained product is a grease product.

109. The collapsible tube of claim 88, wherein said contained product is a viscous plastic.

110. Said cap of claim 88, comprising an interior bulge to act upon said flexible throat to urge said flexible throat to engage said internal thread form and said external thread form.

111. Said cap of claim 110, wherein said cap is not flexible.

112. Said cap of claim 111, wherein said cap is rigid.

113. The collapsible tube of claim 88, further comprising:
a flexible cone narrowing from said flexible throat away from said flexible shoulder including a narrow opening to dispense essentially all of said product.

* * * * *